United States Patent [19]

Whipp

[11] Patent Number: 5,192,486
[45] Date of Patent: Mar. 9, 1993

[54] PLANT AND PROCESS FOR FLUIDIZED BED REDUCTION OF ORE

[75] Inventor: Roy H. Whipp, Miami, Fla.

[73] Assignee: Fior de Venezuela, Pto. Ordaz, Venezuela

[21] Appl. No.: 708,898

[22] Filed: May 31, 1991

Related U.S. Application Data

[62] Division of Ser. No. 501,490, Mar. 30, 1990.

[51] Int. Cl.$^5$ ............................................. C21B 7/22
[52] U.S. Cl. .................................... 266/156; 266/172
[58] Field of Search ............... 266/142, 156, 172, 175; 432/239

[56] References Cited

U.S. PATENT DOCUMENTS 3,702,242 11/1972 Fernandes ........................... 266/175
4,359,212 11/1982 Bengtsson et al. ................... 266/172
4,790,517 12/1988 Mathews ............................. 266/156

Primary Examiner—Scott Kastler
Attorney, Agent, or Firm—John-Paul J. Violette

[57] ABSTRACT

An improved FIOR processing plant and method for reducing raw iron ore fines into a 90+% metallized briquette product utilizing a multi-stage fluidized bed reactor in which the reducing and fluidizing gases are the products of partial combustion of methane with oxygen, the gases being introduced into an intermediate zone of the reducing tower above the stage or stages where final metallization occurs. Said processing plant including an ore preparation and feed assembly, a multi-stage reactor assembly, a briquetting assembly, a recycle and fresh reducing gas assembly, and, a heat recuperation assembly.

25 Claims, 4 Drawing Sheets

PLANT AND PROCESS FOR FLUIDIZED BED REDUCTION OF ORE

BACKGROUND OF THE INVENTION

This application is a divisional application of Ser. No. 07/501,490, filed Mar. 30, 1990.

FIELD OF THE INVENTION

This invention relates to a method for reducing ore; and more particularly to an improved FIOR method for producing a stable, reduced iron ore from ore fines.

DESCRIPTION OF THE PRIOR ART

Previously, there have been a number of methods and processes for reducing ore by means of fluidized-bed reactors, which use gas or gas mixtures to reduce the ore and to fluidize the bed. The reducing and fluidizing gas for these processes is produced in special plants, for instance by the steam-reforming process, starting from hydrocarbons and steam. However, that process requires separate plants for gas production and these are very costly, thus markedly increasing the cost of the final product.

Another way of preparing the reducing gases is also known, involving the partial combustion of fuel oil and other higher hydrocarbons.

The injection of a sub-stoichiometric mixture of hydrocarbons and air directly into the reducing bed has also been proposed. Although this does away with the costly plants previously needed to make reducing gases, it has its drawbacks: for instance, the sulphur content of the fuel oil, which contaminates the metal produced, the fact that part of the hydrocarbon cracks producing carbon black directly in the reducing bed, and the fact that the nitrogen contained in the air used builds up in the plant.

Accordingly, there is a need for a process eliminating these drawbacks, permitting direct reduction of ores in fluid beds cheaply and with no possibility of the metal produced being contaminated with sulphur.

The FIOR process was developed by ESSO Research and Engineering Company in the late 1950's and early 1960's. The process was intended to produce Direct Reduced Iron (DRI) briquettes by a Fluidized Iron Ore Reduction (FIOR) processing scheme which used iron ore fines as a feedstock. The fluidizing gas was provided by the reforming of light hydrocarbon gases.

The first process development work was done at a 5 ton/day pilot plant at the ESSO Research Labs in Baton Rouge, La. Test work began in 1962 and terminated in 1966. Based upon the preliminary results of this test work, a semi-commercial plant was built in Darmouth, Nova Scotia. The plant had a design capacity of 300 tons/day, and operated from 1965 to 1969. A total of 56,000 tons of DRI briquettes were produced, equivalent to only 15% of the expected production at the design rate.

During the ensuing years, the plant operations personnel continued to improve the process by way of mechanical and operational refinements. These refinements were often implemented in the field without benefit of engineering studies, due to the limited resources of the company. These improvements resulted in a steady increase in production, and the plant reached 96% of design production in 1986.

Competing pellet based DRI processes cannot utilize iron ore fines for feed as the FIOR process does. These processes had previously required much less energy per ton of product, but their energy consumptions have increased recently as they have incorporated hot briquetting, a process that FIOR research pioneered. Therefore, an improved FIOR design could be more viable than competing DRI processes for many areas which possess large quantities of ore fines, have low energy costs, and need to export DRI.

The net result of this developmental process is that the present plant design and operation has improved over the original contemplated designs. A new plant utilizing the FIOR process would have to incorporate the changes in order to be thermally efficient and economical. In addition to these already implemented changes, a new plant design would have to include equipment and process improvements that are made possible by current technology and by better knowledge of the process shortcomings.

The previous design was not intended to be thermally efficient due to the very low natural gas prices that were prevalent 15 years ago. Today, a DRI plant has to be as thermally efficient as possible due to the high incidence of fuel cost upon the overral production cost, even in countries with relatively inexpensive energy. The improved design contemplates a 25% decrease in energy requirements as compared to the previous design.

The plot configuration utilized in the previous design was not optimized with respect to economy of layout. The previous design is a hybrid of old refinery and steelmaking technology, and is characterized by large plot areas. Competing DRI processes are much more compact. A more compact FIOR plant layout would result in economics of construction (less piping and structure) and operation (fewer operators). The improved design will result in a reduction in plant operating equipment plot areas of up to 40%, and a decrease in operating manpower of up to 25%.

Another area covered by the improved design is mechanical reliability. Some pieces of mechanical equipment that have historically been troublesome in the previous design are either replaced by more reliable equipment or removed in the improved design. In addition, design improvements have been included to eliminate problems of dust ingestion into equipment, which has caused equipment operating problems in the previous design.

SUMMARY OF THE INVENTION

The present invention is directed to an improved process for reducing ore utilizing a multi-stage fluidized bed reactor in which the reducing and fluidizing gases are the products of partial combustion of methane with oxygen, the gases being introduced into an intermediate zone of the reducing tower above the stage or stages where final metallization occurs. The process takes place at pressures of between 1 and 15 atmospheres and methane and oxygen in sub-stoichiometric proportions, are introduced into a combustion chamber, the outlet of which is connected to the reactor in an intermediate zone, for instance: between the last and the next-to-the-last reduction beds. In the reduction chamber the methane reacts with the oxygen to produce carbon monoxide, hydrogen and water and a small percentage of carbon dioxide. Part of the methane, generally less than 10%, remains unburnt and circulates in the reactors without causing trouble. The gas thus produced, together with the gas coming from the lower stages of metallization, passes through the upper beds where the ore is in a low-reduced state. In this way the amounts of $CO_2$ and $H_2O$ present do not hinder the progress of this phase of the reduction process. Once the reducing gas has passed through the reactor and emerged from its top, the dust and the water it has picked up are separated out and the $CO_2$ removed, after which the gas is reheated and sent to the last reducing bed.

In this way, the reducing gas, composed essentially of CO and $H_2$, is fed precisely in the zone where the presence of a pure reducing gas is most necessary, thus completing the ore reduction process. The carbon black produced in the partial combustion chamber can be removed before it enters through the grating of the overlying fluidized bed.

Accordingly, it is the principal object of this invention to provide a more efficient FIOR process.

A further object of this invention is to provide a more economical FIOR process.

A further object of this invention is to provide a more compact FIOR process.

A further object of this invention is to provide a process where fouling of reactor internals is minimized or reduced.

A further object of this invention is to provide a stable reduced product which is easily transported over long distances.

BRIEF DESCRIPTION OF THE DRAWINGS

For a fuller understanding of the nature of the present invention, reference should be had to the following detailed description taken in connection with the accompanying drawings in which.

Like reference numerals refer to like parts thoughout the several views of the drawings and numbers in ( ) correspond to stream properties.

DETAILED DESCRIPTION OF THE PREFERRED EMBODIMENT

The Plant Assembly

Figure 1:
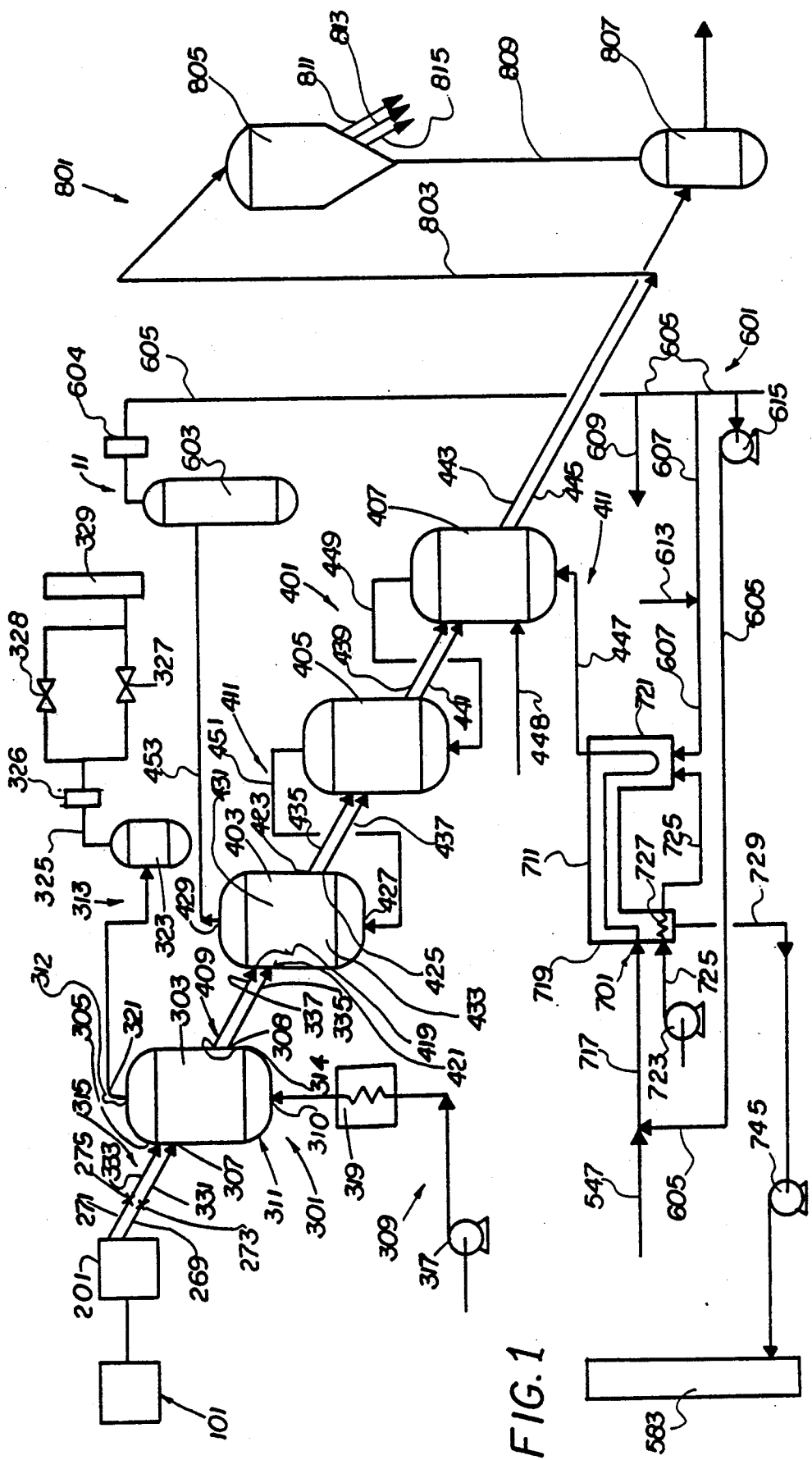
FIG. 1 is a perspective view of the overall plant including ore preheat reactor assembly, reducing reactor assembly, and recycle gas assembly.

As shown in FIG. 1, the present invention is directed towards a processing plant assembly, generally referred to as 11, and process for reducing finely divided iron oxide material in a circulating fluidized bed. Hereinafter, individual components and assemblies shall be referred to numerically and may be referenced in the drawings. In addition, flow streams and product referred to in the process description shall be referred to by numerals in parentheses ( ) and may be referenced in the table included at the end of the detailed description describing the composition of said flow streams and product.

Referring to FIG.1, the processing plant assembly 11 is comprised of an ore preparation assembly 101, an ore feed assembly 201, a preheat reactor assembly 301, a reducing reactor assembly 401, a reducing gas preparation assembly 501, a recycle gas assembly 601, a reducing gas delivery assembly 701, a briquetting assembly 801, and, a utilities assembly.

The Ore Preparation Assembly

Figure 2:
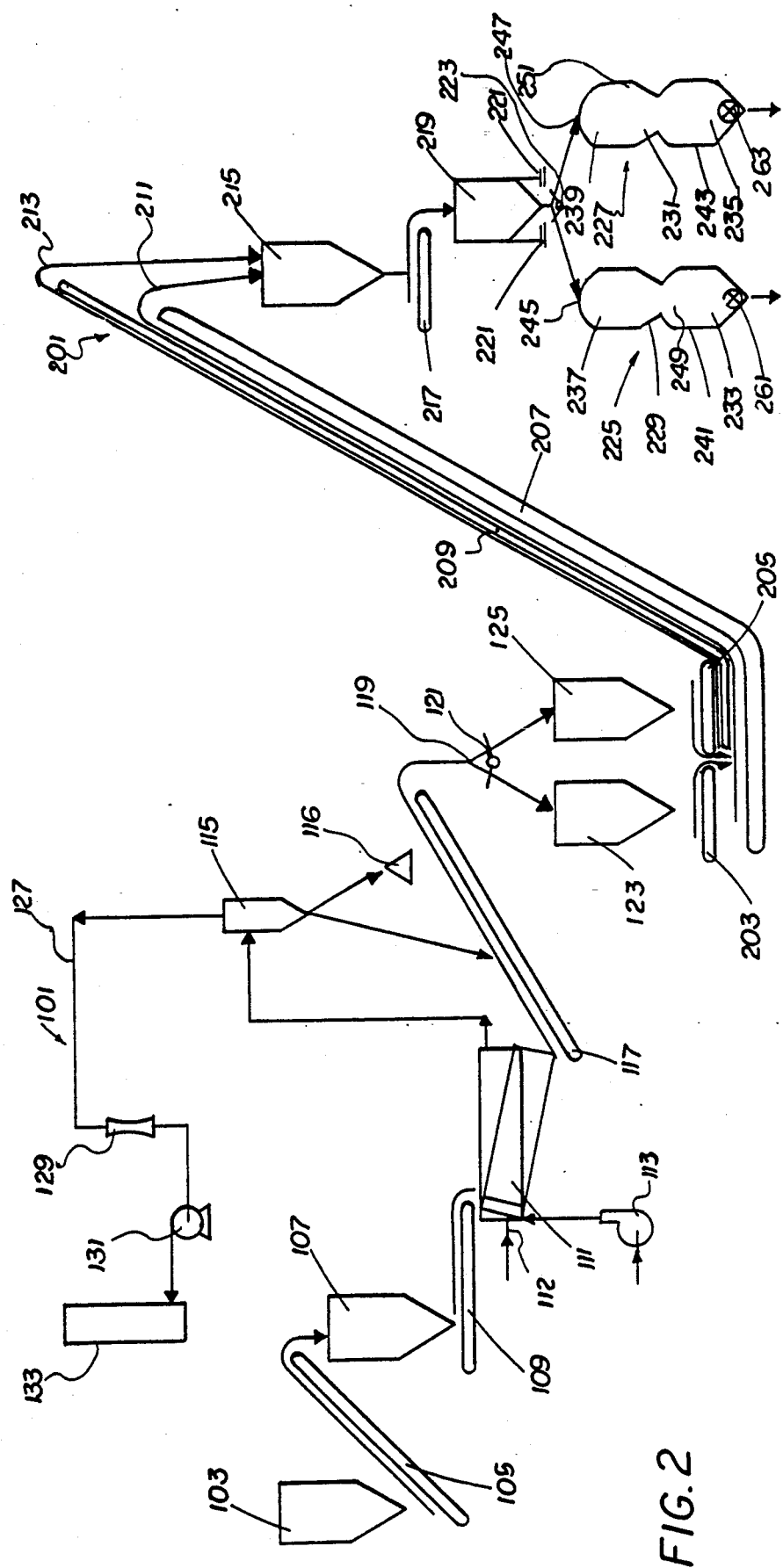
FIG. 2 is a perspective view of the ore preparation and feed system.

Referring to FIGS. 1 and 2, the ore preparation assembly 101 is comprised of an ore feed loading hopper 103 for loading ore from trucks, etcetera; a conveyor belt 105 for conveying ore from the hopper 103 to a drier feed bin 107; a drier weight feeder 109 for conveying a measured amount of ore to an ore drier 111; an air blower 113 for blowing combustion air through a furnace section of the drier 111; dry cyclones 115 for separating entrained ore fines from combustion gases leaving the drier 111; a conveyor 117 for conveying ore from the drier 111 to a splitter hopper 119; a diverter gate 121 for diverting ore from said splitter hopper 119 to two main ore feed bins 123, 125.

Wet iron ore fines under ¼" in diameter and with a suitable particle size distribution for use in fluid beds are loaded into the ore feed loading hopper 103, which is located at grade. The fines are transferred from the hopper 103 by a conveyor belt 105 to the drier feed bin 107. The drier feed bin 107 includes a drier weight feeder 109 located at the discharge outlet. The feeder 109 provides an adjustable, continuous ore fine feed rate in order that ore may be metered out at a pre-determined rate to the ore drier 111.

The ore drier 111 is a rotary kiln drier burning natural gas fuel provided at natural gas inlet 112 in a stream of air provided by a blower 113. The ore drier 111 dries the wet iron ore fines under ¼" to a free water content of under 0.2% and a temperature of 100°-110° C. The dried ore fines exitting the drier 111 are deposited onto a conveyor 117 for further transport.

Combustion gases exiting from the dryer 111 are directed by an exhaust pipe network 127 through dry cyclones 115 in order to remove entrained ore fines, through a venturi type scrubber 129 to clean the exhaust gases, through an induced draft fan 131 utilized to accelerate the flow of exhaust gases, and out of a vent stack 133 into the atmosphere. The de-entrained ore fines settle to the bottom of the dry cyclones 115 where they are either re-directed onto the conveyor 117 with the ore fines mainstream or are deposited into a storage pile 116.

The conveyor 117 provides a transport means for conveying fines from the the drier feed bin 107 to the two main ore feed bins 123, 125. A splitter hopper 119 and diverter gate 121 are located above the two ore feed bins 123, 125 and beneath the end of the conveyor 117 for diverting fines into either or each of the respective main feed bins 123, 125 from the conveyor 117. The two main feed bins 123, 125 have level probes to avoid overfilling and closable outlets at the bottom to allow for flow of ore fines into the ore feed assembly 201, and include a storage capacity of a 10-12 hour inventory of fines. The 10-12 hour storage capacity allows the ore preparation assembly to be shut down for maintenance without affecting plant operation.

The Ore Feed Assembly

Referring to FIGS. 1 and 2, the ore feed assembly 201 is comprised of two variable speed feed conveyors 203 and 205; two high angle flexible wall type conveyors 207 and 209; two discharge chutes 211 and 213; a lockhopper surge bin 215; a lockhopper charge conveyor 217; a weight bin 219 including multiple load cells 221;

a diverter valve 223; two reactor ore feed systems 225, 227; two rotating drum feeders 261, 263; and, preheater reactor connecting pipes 269, 271 equipped with isolation valves 273, 275.

Two variable speed feed conveyors 203, 205 located beneath the main feed bins 123, 125 are each designed to handle a feed capacity of up to 120% of the plant design feed rate to the preheat reactor assembly 301 and transport the ore from the two main ore feed bins 123, 125 onto two high angle flexible wall type conveyors 207, 209. The excess capacity of the conveyors 203, 205 allows for usage of only one conveyor 203 or 205, one main feed bin 123 or 125, and one conveyor 207 or 209 during a given period of time. The design is such that the feed bin 123 feeds into the conveyors 203 and 207; while the feed bin 125 feeds into the conveyors 205 and 209. The high angle conveyors 207, 209 carry the ore fines to the top of a reactor structure, which contains the preheat and reactor assemblies 301, 401 and is about 80 meters above grade. From the high angle conveyors 207, 209, the ore is fed through two special discharge chutes 211, 213, corresponding to respective of the conveyors 207, 209, and into a lockhopper surge bin 215 located at the top entrance of the reactor structure. The lockhopper surge bin 215 is implemented in order to assure constant ore feed to the preheat assembly 301. A lockhopper charge conveyor 217 is located beneath the discharge port of the surge bin 215 and transports ore from the lockhopper surge bin 215 to the weigh bin 219. The weigh bin 219 includes multiple load cells 221 for weighing a pre-determined charge of ore. Once this pre-determined amount has been deposited into the weigh bin 219, the charge conveyor 217 automatically shuts down.

The surge bin 215 includes level probes for maintaining surge bin levels within a pre-determined range. The level probes connect to controls monitoring the speed of said variable speed conveyors 203, 205 for automatic adjustment of feed rate depending on the surge bin levels.

Once the weigh bin 219 is filled, a valve is opened at the bottom of said weigh bin 219 and a diverter valve 223 located beneath the weigh bin 219 directs the depositing of fines into one of two ore feed systems 225, 227.

The two reactor ore feed systems 225, 227 are situated in parallel, where each of said reactor ore feed systems 225, 227 is designed to individually meet a pre-specified preheat reactor ore feed rate in order that one of the two feed systems 225, 227 may deliver said pre-specified preheat reactor ore feed rate in the event of mechanical failure of the other feed system 225, 227. Each of said reactor ore feed systems 225, 227 comprises an upper lockhopper 229, 231 respectively, a lower lockhopper 233, 235 respectively, connected in series, and a pressurizing system (not shown) for pressurizing the respective lockhoppers 229, 231, 233, 235. Each of said lockhoppers 229, 231, 233, 235 comprise a conical pressure vessel 237, 239, 241, 243; and, a material inlet valve 245, 247, 249, 251.

The weigh bin 219 being located above the upper lockhoppers 229, 231 allows for gravity feed to the respective reactor ore feed systems 225, 227. When the weigh bin 219 is emptying its contents, the material inlet valves 245, 247 of the upper lockhoppers 229, 231 are open to receive the dry ore fines at atmospheric pressure. During this filling process, the material inlet valves 249, 251 of the lower lockhoppers 233, 235 remain closed in order to maintain the lower lockhopper pressure at pre-determined preheat reactor pressure levels. Once the contents of the weigh bin 219 have been emptied into the upper lockhoppers 229, 231, the material inlet valves 245, 247 are closed and the upper lockhoppers 229, 231 are pressurizable.

The upper and lower lockhopper pressure vessels 237, 239, 241, 243 are respectively pressurizable by said pressurizing system to a pre-determined preheat reactor pressure, such that the pressure of said upper and lower vessels may be equalized, once the pressure between the two lockhoppers is equal, and the lower lockhoppers 233, 235 have a low ore inventory, the material inlet valves 249, 251 opens and the entire ore charge is transferred to the lower lockhoppers 233, 235 by gravity. The material inlet valves 249, 251 between the two lockhoppers then closes and the upper lockhoppers 229, 231 are de-pressurized to await another charge. The ore contained in the lower lockhopper 233, 235 is metered into the preheat reactor assembly 301 by rotating drum feeder 261, 263. The conducts 269, 271 connect the lockhoppers 233, 235 to the preheat reactor assembly 301.

The Ore Preparation and Feed Process

Referring to FIG. 2, wet iron ore fines under ¼" in diameter and with a suitable particle size distribution for use in fluid beds are loaded into an ore feed loading hopper 103 located at grade. The fines are transferred from the hopper by a conveyor belt 105 to a drier feed bin 107 which is equipped with a drier weigh feeder 109 at the discharge of the bin. The feeder provides a constant but adjustable ore fines feed rate to the ore drier 111.

The ore drier 111 is a rotary kiln drier which dries the wet iron ore (39) to a free water content of under 0.2%. The drier 111 burns natural gas (41) in a stream of air (42) provided by a blower 113. The combustion gases (43) exiting from the drier pass through dry cyclones 115 where part of the entrained fine ore particles are removed. The fines can either be returned to the dried ore being transported to the main ore feed bins 123, 125, or they can be diverted to the ore storage area 116 in the event that there are excess fines in the reducing reactor circuit. The combustion gases are directed along a line 127 to be cleaned in a venturi type scrubber 129, exhausted via an induced draft fan 131, and vented through a vent stack 133.

The dried ore (40) exits the drier at a temperature of 100°–110° C., and is transported by a conveyor 117 to a splitter hopper located above the two main ore feed bins 123, 125. The ore fines are directed to one of the two bins by means of a diverter gate 121. The bins are equipped with level probes to avoid overfilling.

The two main feed bins contain a 10–12 hour inventory of iron ore. This allows the ore preparation area to be shut down for maintenance without affecting plant operation. The bins are equipped with variable speed feed conveyors 203, 205 on the bottom. The variable speed feed conveyors are designed for up to 120% of the design dry ore feed rate to the reactor circuit, which permits using only one main feed bin and one conveyor at a time. The feed conveyor in service discharges onto a high angle flexible wall type conveyor 207 or 209 which carries the ore fines to the top of the reactor structure, about 80 meters above grade. Each main feed bin is equipped with a flexible wall conveyor in order to guarantee constant ore feed to the process. The discharge chutes of the two flexible wall conveyors terminate in a lockhopper surge bin 215 at the top of the reactor structure.

The lockhopper surge bin is equipped with a lockhopper charge conveyor 217 which feeds ore into a weigh bin sitting on load cells. The charge conveyor shuts down when the total weight in the bin reaches a preset amount. A diverter valve 223 located below the weigh bin directs the ore charge to one of the two ore feed systems. The lockhopper surge bin is equipped with level probes which speed up or slow down the variable speed feed conveyor on the main ore feed bin that is in service in order to maintain the lockhopper surge bin level within an acceptable range.

There are two parallel reactor ore feed systems which consist of two lockhoppers in series. A lockhopper is a conical pressure vessel which has material inlet and outlet valves as well as a pressurizing system using compressed air. Once the ore charge has been weighed into the upper lockhopper 229 or 231 from the surge bin, the upper mineral inlet valve is closed and the lockhopper is pressurized to preheat reactor pressure. Once the pressure between the two lockhoppers is equal, and the lower lockhopper has a low ore inventory, the valve between the two lockhoppers opens and the entire ore charge is transferred to the lower lockhopper 233 or 235 by gravity. The valve between the two lockhoppers then closes and the upper lockhopper is depressurized to await another charge. The ore contained in the lower lockhopper is metered into the preheat reactor by a rotating drum feeder 261 or 263.

Both of the two parallel ore feed lockhopper systems are designed for up to 120% of the design ore feed rate to the preheat reactor. Normally both systems are in service at a 50% capacity. In case of a mechanical failure in one of the two systems, it is removed from service and the capacity of the other system is increased to 100% in order to maintain ore feed rate.

The Preheat Reactor Assembly

Referring to FIG. 1, the preheat reactor assembly 301 is comprised of an ore preheat reactor 303 including dry ore feed inlet ports 305, 307, preheated dry ore (33) feed outlet ports 308, 314, an air intake port 310, and a gas exhaust port 312; a combustion air supply assembly 309; a natural gas supply assembly 311; an exhaust gas assembly 313; and, a preheat reactor feeder assembly 315.

The preheat reactor 303 comprises a carbon steel shell; a dual insulation and refractory layer internally lining said shell; a gas distribution grid in the lower part of the reactor 303; and, a cyclone system in the upper part of the reactor. The grid and cyclone system are made of heat resistant alloy. The grid comprises a flat perforated circular plate that is slightly smaller in diameter than the inside of the reactor. The circular plate is sealed to said steel shell by means of a vertical cylinder comprised of thin plate steel supported centrally by vertical, small diameter tubes jutting through holes perforated in said circular plate and welded in place.

The cyclone system is comprised of pairs of primary and secondary cyclones. The cyclones are located in front of the gas exhaust port 312 and are designed to remove entrained iron ore fines from exiting combustion gases. A recycle conduit connects the material outlet of the cyclone to the bottom of the reactor 303 providing a path for de-entrained ore fines to be returned to the main ore fines flowstream prior to exiting through the ore outlet port 308.

The air intake port 310 is located at the bottom of the reactor 303, so that any entering air flow is forced through said tubes providing an evenly distributed gaseous flow across the cross sectional area of said preheat reactor. A combustion air supply assembly 309 is designed to provide desired quantities of forced air flow through the intake port 310, developing a counter-current flow to the ore fines gravity flow, and creating a fluidized bed of iron ore fines.

A series of natural gas burners are located inside said preheat reactor 303 about 1 meter above the grid and are supplied by a natural gas assembly 311. Preferably, an air to natural gas ratio is maintained so that there is about 2% $O_2$ content in the flue gas for flue gas for good combustion.

The combustion air supply assembly 309 includes a centrifugal air compressor 317 and a reformer heat recuperation system 319. The centrifugal air compressor 317 is equipped with suction filters to eliminate dust and water-cooled intercoolers to remove the heat of compression. The combustion air is compressed to about 13–14 $kg/cm^2$, and is preheated to 700–750 degrees C. in the reformer heat recuperator system 319.

The exhaust gas assembly 313 includes a refractory lined reactor outlet pipe 321; a gas quench assembly 323, a venturi type scrubber 326; an exhaust line 325 including two pressure letdown valves 327, 328; and, a stack 329. The refractory lined reactor outlet pipe 321 connects the gas exhaust port 312 to the gas quench assembly 323. From the gas quench assembly 323, the exhaust line 325 carries the cooled exhaust gas through the venturi scrubber 326, through the pressure letdown valves 327, 328 for depressurizing the exiting gases before release, and through the stack 329 for release into the atmosphere.

The preheat reactor feeder assembly 315 includes a fabric of linking refractory lined pipes extending from the ore feeder assembly 301 through the preheat reactor and to the reactor assembly 401. A pair of refractory lined, preheat reactor ore inlet pipes 331, 333 connect the dry ore feeder outlet pipes 269, 271 to the ore inlet ports 305, 307 located near the top of said preheat reactor 303. The ore inlet pipes include isolation valves for maintaining constant solid flow from said feeder assembly 201 and into the reactor assembly 301. Additionally, an inert gas source supplies a flow of inert gas into said refractory lined pipe preventing air from being carried within said inlet pipe and into the reactor assembly 301. A pair of refractory lined preheater outlet pipes 335, 337 connect the outlet ports 308, 314 of preheat reactor 303 to the inlet ports of reactor 403. The preheater outlet pipes 335, 337 include cycling slide valves for maintaining continuity of ore fines flow. The resulting cascading structure provides a flow path for ore fines to travel downward in a gravity flow through the preheat reactor 303 and to the reactor assembly 401 in series fashion, where the feeder assembly 201, preheat reactor assembly 301, and the reactor assembly 401 have been fixed in graduated, decreasing height to facilitate gravity flow of the iron ore fines. The preheater outlet pipes 335, 337 include cycling slide valves for maintenance of a constant solid flow from the preheat reactor 303. Additionally, an inert gas source supplies a flow of inert gas into said refractory lined pipes preventing air from being carried within.

The Ore Preheat Reactor Process

Referring to FIG. 1, the dry iron ore (32) from the two ore feed systems passes through pipes equipped with isolation valves into the ore preheat reactor 303. The function of the preheat reactor is to heat the ore to reaction temperature and to remove hydrated water and some sulfur and phosphorous from the ore. This is accomplished by fluidizing the iron ore fines in an up-flowing air stream (13) and burning natural gas (24) that is injected into the fluid bed. Since the temperature of the bed is about 750° C., the natural gas burns upon contact with air. A slight excess of air is provided. The combustion air is provided by a centrifugal air compressor 317 equipped with suction filters to eliminate dust and with water cooled intercoolers to remove the heat of compression. The air is compressed to about 13-14 kg/cm$^2$ with the centrifugal air compressor 317, and is preheated to 700°-750° C. in the reformer heat recuperator system 319. The natural gas is injected by a series of burners located around the reactor about 1 meter above the grid. The air to gas ratio is maintained so that there is about 2% $O_2$ in the flue gas (dry). A purge gas consisting of steam is injected to the burners to prevent plugging when natural gas flow is low.

The preheat reactor is constructed of a carbon steel shell and has a dual layer internal lining of insulation and refractory. The reactor contains a gas distribution grid in the lower part and a cyclone system in the upper part. These components are constructed of a heat resistant alloy. The grid consists of a flat perforated circular plate that is slightly smaller in diameter than the inside of the reactor. The plate is sealed to the vessel shell by way of a vertical cylinder made of thin plate, and is supported in the center by vertical pipes. Small diameter tubes are placed through the holes perforated in the flat plate and are welded in place. The fluidizing air which enters through the bottom of the reactor is forced through the tubes, which provides an even air flow distribution across the cross-sectional area of the reactor.

The cyclones consist of pairs of primary and secondary cyclones which remove entrained iron ore fines from the combustion gases exiting the fluid bed. The fines removed by the cyclones are returned to the fluid bed. The gases (31) exit the cyclones through outlet pipes and pass through a refractory lined reactor outlet pipe 321 to the quench and gas cleanup assemblies 323, 326. The combustion gases have to be cooled and scrubbed of fines prior to being vented. The cooling is done by a water quench assembly 323, although it is possible to cool the gas by producing steam in an exchanger. After cooling, the gases are scrubbed in a venturi type scrubber 326, and are vented via pressure letdown valves 327, 328 to a stack.

The preheat reactor 303 is connected to the first reducing reactor 403 by two refractory lined pipes 335, 337 equipped with cycling slide valves which maintain a constant solids flow to the reactor assembly 401. A flow of inert gas is injected into the lines 335, 337 to prevent air from being carried into the reactor assembly 401.

The Reducing Reactor Assembly

Referring to FIG. 1, The reducing reactor assembly 401 is comprised of a series of three ore reducing reactors 403, 405, 407; a reactor ore feeder assembly 409; and, a reducing gas feeder assembly 411.

The three ore reducing reactors 403, 405, 407 are oriented in a graduated grade, series arrangement, where reactor 403 is fixed at a highest grade level and is referred to as the uppermost reactor 403 and reactor 407 is fixed at a lowest grade level and is referred to as the lowermost reactor 407. Each of said three reducing reactors 403, 405, 407 include two ore inlet ports 419, 421; two ore outlet ports 423, 425; a reducing gas intake port 427; a reducing gas exhaust port 429; a vertical, upper reaction chamber 431, downwardly connected to a lower, narrower, vertical reaction chamber 433. The reducing gas intake port 427 is located at the bottom of the lower reaction chamber 433 for receiving fluidizing gas, and, the reducing gas exhaust port 429 is located at the top of the upper reaction chamber 431 for passing the fluidizing gas out of the respective reactor. The respective ore outlet ports 423, 425 are located near the bottom of the lower reaction chamber 433 for passing the reduced ore out of the respective reactor, and, the respective ore inlet ports 419, 421 are located at the top of the upper reaction chamber 431 for receiving ore fines; a cyclone separator (not shown) is located within the upper reaction chamber 431 and in front of the gas exhaust port 429, in order to separate entrained ore fines from the circulating fluidization gas before passing out of the respective reactor; a recycling conduit (not shown) connects the material exhaust portion of the cyclone separator to the bottom of the lower reaction chamber 433 establishing a channel through which the de-entrained fines may flow to rejoin the mainstream ore flow prior to passing through the ore outlet ports 423, 425.

The cyclone separator comprises a pair of primary cyclones and externally actuated valves, where the externally actuated valves seal off the cyclones in the event said cyclones become plugged with iron ore fines. By utilizing only primary versus a primary-secondary pair of cyclones as in the preheater reactor the vessel height can be reduced by 5 feet.

Each of said reactors comprises a carbon steel shell, and a dual insulation and refractory layer internally lining said shell. Each of the reactors further include a gas distribution grid located across the cross-section of the lower part of the lower vessel 433, where the grid provides a distribution path through which an upflowing stream of reducing gas is forced to pass resulting in an evenly distributed, counter-current flow to that of the iron ore fines developing a fluidized bed of said fines.

The gas distribution grid is formed of heat resistant alloy and comprises a flat perforated circular plate that is slightly smaller in diameter than the inside of the reactor. The circular plate is sealed to said carbon steel shell by a vertical cylinder made of thin plate steel and supported centrally by vertical, small diameter tubes which jut through holes perforated in the circular plate and are welded in place. It is these tubes through which the reducing gas stream is forced to provide an evenly distributed reducing gas flow across the cross sectional area of said reactor. In the case of reactor 403 and 405, the tubes are replaced with cones to prevent rapid plugging of the grid by reduced ore fines carried by the gas.

The reactors incorporate the same design features as the preheat reactor, except that they are larger in diameter and have only primary cyclones instead of primary-secondary sets. The cyclones are equipped with externally actuated valves which allow the cyclones to be sealed off if they plug up with iron ore fines.

The reactor ore feeder assembly 409 includes a fabric of linking refractory lined pipes extending from the preheat reactor assembly 301 through the reactors of the reactor assembly 401 and to the briquette feeder assembly 801. A pair of refractory lined, preheater ore outlet pipes 335, 337 connect the preheater ore feed outlet ports 308, 314 located near the bottom of said preheat reactor 303 to the ore inlet ports 419, 421 of the uppermost reactor 403. The ore inlet pipes 335, 337 include cycling slide valves for maintaining constant solid flow from said preheat reactor 303 and into the reactor assembly 401. Additionally, an inert gas source supplies a flow of inert gas into said refractory lined pipe preventing air from being carried within said inlet pipe and into the reactor assembly 401. A pair of refractory lined outlet pipes 435, 437 connect the outlet ports of reactor 403 to the inlet ports of reactor 405; a pair of refractory lined outlet pipes 439, 441 connect the outlet ports of reactor 405 to the inlet ports of reactor 407; and, a pair of refractory lined outlet pipes 443, 445 connect the outlet ports of reactor 407 to the inlet ports of the briquetting assembly 801. The resulting structure of cascading reactors and piping provides a flow path for ore fines to travel downward in a gravity flow through each of the reactors and to the briquetting assembly 801 in series fashion, where each of said ore reactors has been fixed in graduated, decreasing height from said uppermost reactor 403 to said lowermost reactor 407. Said refractory lined pipes 443, 445 extending from the lowermost reactor 407 include cycling slide valves for maintenance of a constant solid flow from said lowermost reactor 407. Additionally, an inert gas source supplies a flow of inert gas into said refractory lined pipes preventing air from being carried within.

The reducing gas feeder assembly 411 includes: 1) a pipe 447 connecting the intake port of the lowermost reactor 407 to a reducing gas assembly 701 supplying recycled and fresh pressurized reducing (hydrogen) gas; 2) a pipe 449 connecting the exhaust port of the lowermost reactor 407 to the intake port of the reactor 405; 3) a pipe 451 connecting the exhaust port of the reactor 405 to the intake port of the uppermost reactor 403; 4) a pipe 453 connecting the exhaust port of the uppermost reactor 403 to a recycle gas assembly 601; and, a pipe 448 connecting an inlet port of reactor 407 to a supply for providing fine oxide powder for preventing defluidization, small quantities of natural gas to maintain carbon control, and small quantities of sulfur, if required to protect reducing gas heater tubes from metal dusting attack. Said reducing gas assembly 701 supplying a reduction agent.

The Reducing Reactor Process

Referring to FIG. 1, the function of the reducing reactors is to remove oxygen from the iron ore fines (33) in fluidized beds using a reducing gas (27) as the fluidizing medium. There are three fluid beds (33,34,35) in series. The ore fines flow downwards by gravity and the gas flows upward between the reactors in a counter-current manner. This counter-current contacting results in a higher utilization of the reducing gas as compared to a single or dual fluid bed system.

The iron ore fines increase in metallization or purity as they pass downward from reactor to reactor. The transfer between the reactors is made by two external refractory lined pipes which connect the reactors. The transfer lines have slide valves to initiate solids flow on start-up, but the valves are left open during normal operation. The entrance to the transfer lines is located about 2 meters above the gas distribution grid inside the reactor so that a dense phase fluidized bed exists above the grid. The ore fines fall into the transfer line by overflow and pass to the next lower reactor by gravity. A pressure seal is maintained in the transfer line by a column of fluidized solids at the solids exit from transfer line.

The reducing gas used to remove oxygen from the ore is of a pre-specified composition and is pre-heated to about 850°–875° C. prior to entering the lowest reducing reactor. This is necessary since the reaction occurs much more rapidly at high temperature, and heat is required to sustain the endothermic reduction reaction. Higher temperature also makes the ore easier to briquette.

The pre-heated reducing gas passes through the grid of the bottom reactor 407 and reacts with the ore solids as it passes upwards through the fluid bed. The gas is cleaned of entrained solids in the cyclones, exits the reactor via a refractory lined pipe, and is passed on to the next reactor 405. The gas distribution grids of the middle and upper reducing reactors are provided with inverted cones instead of tubes. This prevents rapid plugging of the grid by reduced ore fines carried by the gas. The spent reducing gas (30) exiting the third reactor is sent on to the recycle gas assembly 601.

In order to prevent the defluidization of the iron ore particles in the fluid bed, an additive, which consists of a fine oxide powder, is added to the bottom reactor. The additive is metered into the reactor at a rate sufficient to provide about 0.3% of the additive on the product. A small amount of natural gas is also injected into the bottom reactor to maintain carbon control within range. Sulfur can also be added to the lowermost reducing reactor 407 to form a small amount of $H_2S$ if required to protect the reducing gas heater tubes from metal dusting attack.

Gas purges are provided for instrumentation pressure taps and to maintain blasting connections clean. All purges in the reactor circuit use dried process purge gas which comes from the spent reducing gas recycle assembly 601. The carrier gas for the additive is also process purge gas. By not using inert gas as purge, higher recycle rates are permitted and less recycle gas is purged, which improves system efficiency.

The reduced iron product (36) is transferred from the bottom reducing reactor 407 to the briquetter feed drum 805 through a pneumatic transfer line. The solids withdrawal rate from the reactor is controlled by a cycling slide valve at the reactor outlet, which results in a semi-pneumatic type of transport.

A quench drum 807 that is connected to the bottom reactor is provided for use when the briquetters are out of service, and the reducing reactors are in operation. A cycling slide valve in the line allows ore to be dumped at a regulable rate. It is necessary to maintain a flow of ore through the reactors at all times, and the quench drum allows this to be carried out even when the material can not be briquetted.

The Reducing Gas Preparation Assembly

Figure 3:
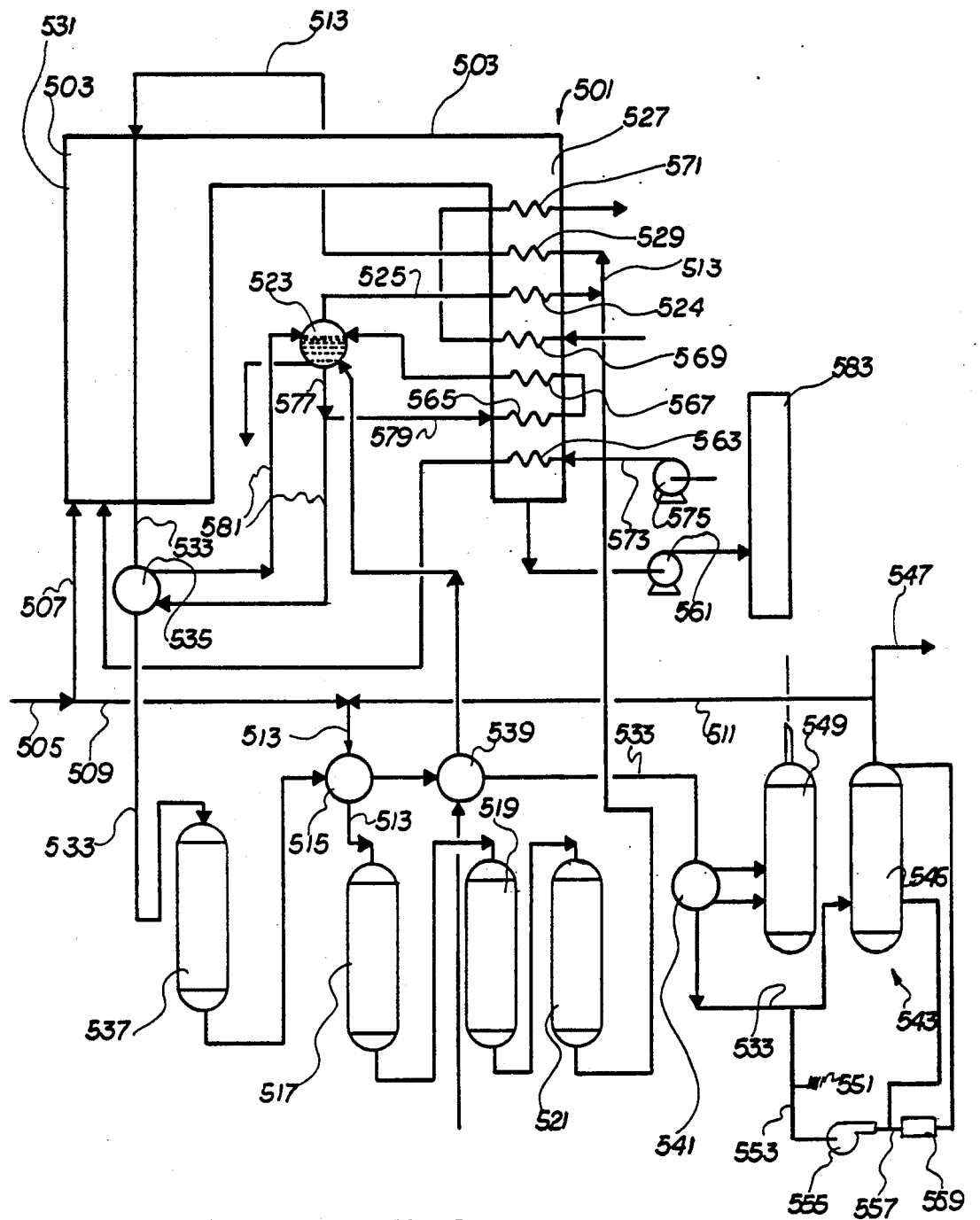
FIG. 3 is a perspective view of the reducing gas, reformed heat recuperation, reformed gas cooling and shift, and reformed gas $CO_2$ removal systems.

Referring to FIG. 3, a fresh reducing gas (hydrogen) preparation assembly 501 produces hydrogen from natural gas; although other methods of producing the reducing gas are compatible with the process. The reducing gas preparation assembly 501 is comprised of a reformer 503 fueled by natural gas supplied by a utility, a condensate knockout drum for natural gas, a heat exchanger 515 for heating natural gas, an hydrogenation vessel 517, two desulfurization drums 519, 521, a steam drum 523, a forced draft fan 561, a reformed gas cooling and shift assembly, and, a reformed gas $CO_2$ removal assembly. The reformed gas cooling and shift assembly includes a heat exchanger 535, a high temperature shift 537, and heat exchangers 515, 539. The reformed gas $CO_2$ removal assembly includes a heat exchanger 541, absorption tower 545, regeneration tower 549, a lean solution pump 555, and an air cooled heat exchanger 559.

The natural gas main 505 provides a path through the condensate knockout drum 506 and a compressor (not shown) for compressing the natural gas to 25 kg/cm² (if necessary), and connects to a reformer fuel line 507 and a reform gas line 509. The reformer fuel line 507 supplies natural gas to the furnace of the reformer 503. The reform gas line 509 and a hydrogen recycle line 511 connect to a mixture line 513; the natural gas and hydrogen being referred to as a mixture. The recycle line 511 injects a small hydrogen stream into the natural gas for hydrogenation of any sulfur compounds.

The mixture line 513 provides a path through a heat exchanger 515, a hydrogenation vessel 517 containing a cobalt-molybdenum catalyst, and a series of two desulfurization drums 519, 521 filled with zinc oxide. The heat exchanger 515 heats said mixture to 370° C., where heat is transferred by cooling reformed gas exiting the reformer 503.

A boiler (steam drum) 523 provides a source of steam superheated to 500° C. through exchanger 524 and passed along a steam line 525 to feed into the mixture line 513. The mixture line 513 then passes through a heat recuperation section 527 of the reformer 503. The mixture line 513 includes a heat exchanger 529 which is heated by combustion gases vented through said heat recuperation section 527. The exchanger 524 is also heated through the venting combustion gases in the heat recuperation section 527.

The reformer 503 includes nickel catalyst filled furnace tubes which connect to the mixture line 513 to provide a path for the mixture to flow through the furnace section 531 of the reformer. The furnace of said reformer 503 includes a furnace box. Said furnace box includes two rows of vertically oriented reformer tubes; an insulated, airtight shell and burners. The burners provide the heat necessary to heat the gas and for the endothermic reforming reaction. Said burners are located inside said insulated, airtight shell and utilize natural gas for fuel from line 507. The nickel catalyst filled furnace tubes empty into a reformed gas line 533.

The reformed gas line 533 passes through a heat exchanger 535, a high temperature shift reactor 537 including an iron-chrome catalyst, heat exchanger 515 for preheating natural and hydrogen gas mixture, a heat exchanger 539 for heating boiler feed water, a heat exchanger 541 for cooling the reformed gas and boiling a rich carbonate solution, and into an absorption tower 545 containing a downflowing potassium carbonate solution for absorbing most of the $CO_2$ from the reformed gas. The purified reformed gas exiting tower 545 is split by two lines, the recycle hydrogen line 511 and the hydrogen delivery line 547.

A regeneration tower 549 connects to said absorption tower 545, receiving carbonate solution including $H_2O$ and $CO_2$ from tower 545 through line 551 and returning stripped carbonate solution to said tower 545 along line 553. Within the regeneration tower 549, carbonate solution is flashed at atmospheric pressure at the top of the regeneration tower 549 and boiled through said heat exchanger 541 to release $CO_2$ and $H_2O$. The stripped carbonate solution is pumped back towards the top of tower 545 through pump 555 and a portion of the carbonate solution is diverted through line 557 and an air cooled heat exchanger 559.

A forced draft fan 561 including suction filters connects to said heat recuperation section 527 through an exhaust line. The forced draft fan increases flow of rate of the exiting combustion gases across heat exchangers 563, 565, 567, 569, 571, 524, 529 located in the heat recuperation section and develops a more even heat exchange across said heat recuperation section. Heat exchanger 563 is utilized to heat combustion air which is delivered along line 573 by a forced air fan 575 to the furnace in the furnace section 531. Heat exchangers 565 and 567 are utilized to boil boiler water which is diverted from line 577 along line 579 and returned to the boiler 523. The balance of boiler water from line 577 is directed through heat exchanger 535 along line 581 and back to the boiler 523. Heat exchangers 569 and 571 heat combustion air for the preheat reactor 303 and represent the heat exchanger 319 previously discussed and referred to in FIG. 1. After passing through each of the respective heat exchangers, the exiting combustion gases are then exhausted through stacks or utilized as an inert gas source in various locales in the plant.

The Process for Preparing Reducing Gas

Referring to FIG. 3, the process is based upon the use of a natural gas feed (1) to produce the reducing gas, although other methods of producing the gas are compatible with the process.

Natural gas from the supplier is passed through a condensate knockout drum, and is compressed to 25 kg/cm², if required. A small recycle stream of hydrogen (23) is added to the gas for hydrogenation of sulfur compounds. This mixture is preheated to 370 degrees C. in a heat exchanger 515, where heat is transferred by cooling the reformer gas (9). The preheated gas (2) is sent to a cobalt-molybdenum catalyst filled vessel 517 where the catalyst promotes the reaction of non-$H_2S$ components with $H_2$ to form $H_2S$, which can then be removed by ZnO. The gas passes through two ZnO filled vessels 519, 521 connected in series; and the $H_2S$ contained in the natural gas is removed by reaction with the ZnO. The reaction is not reversible, and the vessels have to be refilled periodically with ZnO.

Steam (3) required to combine with the desulfurized natural gas is superheated to 500 degrees C. into the heat recuperation section 527. The desulfurized natural gas is combined with said superheated steam in a ratio of 3.3 moles of steam per mole of natural gas. The combined stream (5) is then heated to 600° C. (6) in the heat recuperation section 527 of the reformer 503 and is introduced into catalyst filled furnace tubes inside the furnace section 531. The gases are heated to 825° C. as they pass down the tubes and the reforming reaction is catalyzed by the nickel containing reformer catalyst to reach pre-specified gas composition levels (7).

The burners of the reformer furnace box use natural gas (18) to provide the heat necessary to heat the gas and for the endothermic reforming reaction. No purge gas is burnt in the reformer.

Combustion air for the burners is provided by a forced draft fan 575 located at grade. The air from the fan is passed through the heat recuperation section 527 of the reformer where it is preheated to about 300° C. with the reformer combustion gases. By preheating combustion air in the reformer heat recuperation section 527, less reformer fuel (18) is required.

The forced draft fan 575 is equipped with suction filters to prevent the entrance of dust into the furnace. Dust pickup through the burners has been a serious problem with natural draft furnaces due to the quantity of dust present from ore and product handling. In this case, the dust is carried into the heat recuperation section 527 from the furnace section 531 where it plugs the fins of the finned tubes, causing a substantial loss of heat transfer capacity.

Referring to FIG. 3, the combustion gases from the reformer burners are pulled through a heat recuperation system 527 which reduces the temperature of the combustion gases (14) from 970° to about 135° C. by preheating feed streams for the reformer, preheat reactor air, and combustion air for the reformer burners. The combustion gases are moved by an induced draft fan 561 which exhausts the gases into a stack 583 that is shared with the reducing gas preheat furnace 711. Use of an induced draft fan 561 provides more precise draft control than is possible with natural draft furnaces. As the combustion gases pass from the reformer box to the induced draft fan, they exchange heat with the following process streams: 1. Preheat reactor air (13) (2d exchanger 571); 2. Steam and natural gas feed (5) (exchanger 529); 3. Steam (4) (superheat exchanger 524); 4. Preheat reactor air (1st exchanger 569); 5. Boiler feed water (Steam generation exchangers 565, 567); and, 6. Reformer combustion air (exchanger 563).

The combustion air and induced draft fans 575, 561 for the reformer and combustion air fans 745, 723 for the reducing gas furnace 711 are equipped with two electric motors using disengaging clutches. One motor will be connected to the plant emergency generator (not shown). Thus, both furnaces will remain online at normal capacity during a power failure.

The reformer 503 is operated at close to a stoichiometric combustion mixture of air (19) and natural gas (18) using an $O_2$ analyzer which controls the air rate from the combustion air fan 575 automatically. As a result, the $O_2$ level in the combustion gas (14) is low enough to allow the gas to be used as inert gas in the areas where inert blankets must be maintained. Part of the combustion gas from the induced draft fan 561 is sent to the utilities area for use as inert gas.

The reformed gas mixture (7) leaving the reformer tubes is cooled from 825° C. to 370° C. in an exchanger 535 which generates 25 kg/cm$^2$ steam. The steam is delivered to the boiler 523 and used as the feed to the reformer 503 along with steam produced in the heat recuperation section 527. The cooled reformed gas (8) is passed through a high temperature shift (HTS) reactor 537 filled with an iron-chrome catalyst which further reacts the CO remaining in the reformed gas mixture with $H_2O$ to produce more $H_2$. The reaction is exothermic, which increases the exit gas temperature to 430° C.

The product gas (9) from the HTS reactor 537 is cooled to about 360° C. in an exchanger 515 using incoming natural gas. The reformed gases (10) exiting the natural gas preheat exchanger 515 pass through a second exchanger 539 and are cooled to about 180° C. by heating boiler feed water (20) for the reformer 503.

The reforming reaction which occurs in the reformer 503 and shift reactor 537 produces $CO_2$. Since an excess of $H_2O$ is required for the reforming reaction, some $H_2O$ is still contained in the reformed gas. Both of these are oxidizing gases in the reactor system and must be largely eliminated from the reformed gas (11) in order that it be effective as a reducing gas. By removing the $CO_2$ from the reformed gas to a low content (under 0.5%), the $CO_2$ in the total reducing gas (27) can be maintained at the target value of about 3.5%, even at the higher recycle ratio used in the improved design.

The reformed gas exiting the BFW preheater exchanger 539 at about 180° C. passes through a $CO_2$ removal system which consists of a hot carbonate acid gas treating unit 543. The reformed gas (11) first enters an exchanger 541 where it reboils rich carbonate solution. It then passes through an absorption tower 545 where the gas is contacted by a downflowing potassium carbonate solution which absorbs most of the $CO_2$ from the reformed gas. Water content of the reformed gas is also reduced by condensation. The lean carbonate solution is introduced to the absorption tower 545 at two points, which permits $CO_2$ removal to under 0.5% in the purified reformed gas (25).

The rich carbonate solution, which contains $CO_2$ and $H_2O$ removed from the reformed gas (11), is regenerated in a regeneration tower 549 by flashing the solution (17) to essentially atmospheric pressure at the top of the tower 549, and stripping the carbonate solution of $CO_2$ and $H_2O$ by means of a reboiler (exchanger 541) at the bottom of the column. The regenerated, or lean, solution is pumped out of the bottom of the regeneration tower 549 and back to the absorption tower 545. Part of the regenerated solution leaving the pump 555 is passed through an air cooled exchanger 559 to cool it.

The $CO_2$ and $H_2O$ (17) liberated from the rich solution in the regeneration tower 549 is vented from the top of the regeneration tower 549. Both these components can be recuperated if desired. The reformed gas (25) exiting the $CO_2$ removal system will contain about 3.5% $H_2O$ and 0.5% $CO_2$.

The Recycle Gas System

Referring to FIG. 1, the recycle gas assembly 601 is comprised of a water cooled quench tower 603, or alternatively a waste heat boiler, which receives spent reducing gas from the reactor assembly 401 through pipe 453; a venturi scrubber 604; a line 605 which carries the cooled spent reducing gas from said quench tower 603 and through said venturi scrubber 604; a centrifugal compressor 615; a reducing gas preheater 711; an air forced draft blower 723; and, an induced draft fan 645. Line 605 is bled by lines 607,609 delivering a small stream of spent reducing gas along line 607 for burning in a reducing gas preheater 711 in the reducing gas supply assembly 701 and a small stream of gas along line 609 for use as a reactor purge gas. Line 607 is further fed by a natural gas supply through line 613. Line 609, prior to delivery in the reactor assembly 401, passes through a drier and compressor for drying the purge gas and compressing to 20 kg/cm$^2$. Line 605 passes through a compressor 615 and then combines with reformed gas delivered along line 547 into line 717. Line 717 then passes through the reducing gas preheater 711 where line 717 connects with line 447.

The reducing gas preheater 711 includes a heat recuperation section 719 and a furnace section 721. The furnace in the furnace section 721 is fueled by line 607 and preheated combustion air is supplied through an air compressor 723 along line 725. In order to preheat the combustion air, line 725 passes through the heat recuperation section 719 and includes a heat exchanger portion 727. The flue gases exit the heat recuperation section 719 along line 729. Line 729 passes through an induced draft fan 745 and into a stack 583, where the gases are exhausted into the atmosphere.

The reducing gas preheater furnace 711 is of a similar construction to the reformer. It has a radiant box with vertical alloy tubes, a heat recuperation section 719, a combustion air forced draft blower 723, and an induced draft fan 745 which exhausts common stack 583. The use of a combustion air fan equipped with a filter eliminates the problem of dust buildup on the heat recuperator tubes.

The Process for Recycling and Delivering Reducing Gas

Again referring to FIG. 1, the spent reducing gas (30) exiting the top reducing reactor still contains a substantial amount of $H_2$, but due to the high water content resulting from the reduction reaction, the reducing power is inadequate to use this gas in the process. This water must be removed by cooling in a water cooled quench tower 603. Also, the gas has to be scrubbed in a venturi scrubber 604 so that it can be compressed to return to the reactor system.

The hot spent reducing gas (30) can be cooled by generating steam in a waste heat boiler, or by direct quench in a water cooled tower 603. This design utilizes a water quench tower 603 to cool the gas, since mechanical reliability of the exchanger is not proven. The use of a waste heat boiler also depends upon the steam requirements of the design.

The cooled gas is scrubbed in a venturi scrubber 604 after leaving the quench tower 603 and a small amount of gas is removed and burnt in the reducing gas preheater 711 to prevent inert gas build-up in the circuit. Due to the elimination of $N_2$ purges in the reactors and the production of low $CO_2$ content (<0.5%) reformed gas, the quantity of reducing gas burnt is small. This improves the efficiency of the process since less reducing gas is used as fuel gas. Some of the recycle gas is removed, dried, and compressed to about 20 kg/cm² for use in the reactor purges.

The cooled and scrubbed recycle gas is compressed in a centrifugal compressor 615 and is combined with the product gas coming from the $CO_2$ removal system. A ratio of 3.5 parts recycle gas to 1 part product gas (also called makeup gas (25)) is used. A small amount of $H_2S$ is added to the reducing gas to prevent metal dusting of the reducing gas preheater 711, if sulfur is not being added directly to the reactors. The combined gas stream (called total reducing gas (27)) is passed through a reducing gas preheater 711 and is heated to 850° to 875° C. The heated gas then passes through a refractory lined pipe to the bottom reducing reactor 407.

The streams which are heated in the heat recuperation section 719 are the total reducing gas (27) and the combustion air. The reducing gas is heated to about 500° C. in the recuperation section and to 875° C. in the radiant box. The amount of preheat of the combustion air depends upon the furnace design. The reducing gas preheater combustion gases are cooled to about 135° C. in the heat recuperation section 719.

The Briquetting Assembly

Figure 4:
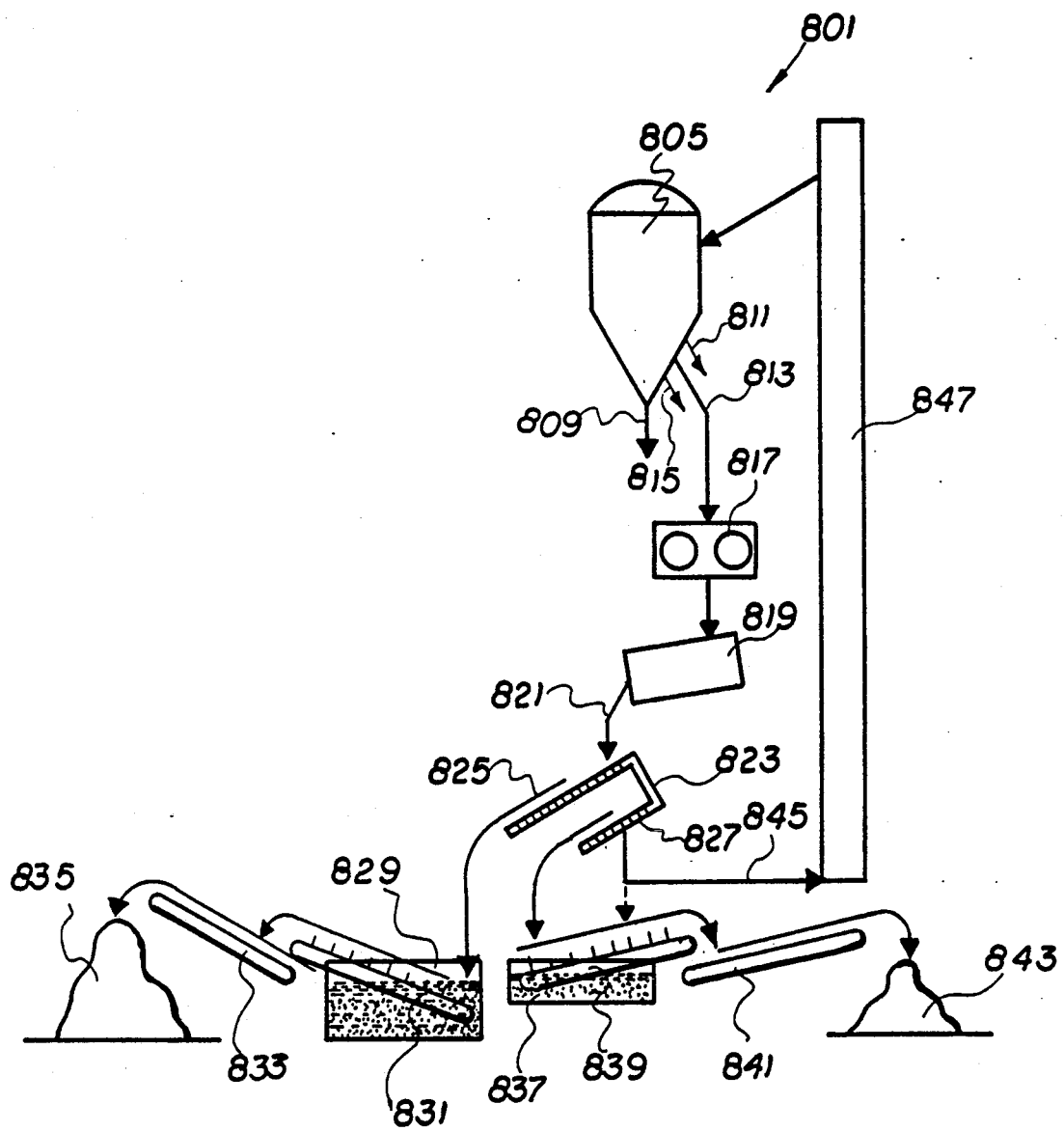
FIG. 4 is a perspective view of the briquetting system.

Referring to FIGS. 1 and 4, The briquetting assembly 801 is comprised of a pipe 803 which is fed reduced fines from line 445; an atmospheric storage drum 805 where pipe 803 deposits its cargo; three briquetter feed lines 811, 813, 815; three briquetting machines 817; three rotating trommels 819; a hot screener 823; a water filled tank 829; a product conveyor 833; a water quench tank 837; a fines and chips conveyor 841; and, a bucket conveyor 847. An alternate route for fines from the reactor assembly 401 is provided along line 443 which deposits the fines into a quench tank 807. Said storage drum 805 may in turn dump its contents into the quench tank 807 through line 809 or send its contents along lines 811, 813, 815 to three briquetting machines, respectively, (where only one briquetter 817 is shown for clarity). Lines 811, 813, 815 include cycling slide values for metering the flow of fines to the briquetters.

A small feed drum is located on top of each of the briquetters 817 where the lines 811, 813, 815 deposit their respective loads. A helical feed screw forces fines between two counter-rotating rolls equipped with briquette shaped molds. One roll is fixed in place, while the other is compressible against the fixed roll with hydraulic cylinders.

A rotating trommel 819 is located under the briquetters 817 for breaking strings of briquettes into individual units. A pipe 821 connects the exit port of the trommel 819 to the entry of a hot screener 823 located beneath the trommel. The screener 823 includes two screens 825, 827 for separating briquettes, chips, and fines. Screen 825 is a ½" screen and separates the briquettes from the fines and chips. The briquettes and large chips are able to slide and roll off the screen 823 and into a quench tank 829 including a discharge conveyor 831. The discharge conveyor 831 provides a path from the quench tank 829 and to a product conveyor 833. The product conveyor 833 provides a path to a briquette storage pile 835.

Screen 827 is located beneath screen 825 for receipt of smaller chips and fines and is comprised of a ½" grating. Of the smaller chips and fines, the larger chips are able to slide off the screen 827 and into a quench tank 837 including a discharge conveyor 839. The discharge conveyor 839 provides a path from the quench tank 837 and to a product conveyor 841. The product conveyor 841 provides a path to a chip storage pile 843. Smaller chips and fines fall through screen 827 where a conveyor 845 provides a path to a bucket conveyor 847. The bucket conveyor provides a path to the storage drum 805.

The entire briquetting assembly 801 through to the quench tanks 829, 837 is enclosed and maintainable under a positive pressure. Inert gas may be funneled into the briquetting assembly atmosphere in order to reduce potential oxidation.

The Process for Briquetting

Referring to FIGS. 1 and 4, the hot reduced iron ore fines (36) must be briquetted in order to make a product that is resistant to reoxidation in storage and that can be easily handled and charged in steelmaking operations. The hot, reduced ore fines are transported from the bottom reducing reactor 407 to an atmospheric storage drum 805 which feeds the three briquetting machines 817.

The drum 805 is located directly above the lowest reducing reactor 407 which allows the briquetting machines 817 to be incorporated into the reactor structure, resulting in a more compact plant layout. The three briquetting machines 817 are designed so that each can handle slightly more than half the design plant capacity, which allows one machine to be shut down for maintenance at all times.

The reduced fines are metered from the storage drum 805 into the briquetting machines 817 through three feed lines 811, 813, 815 which each have a cycling slide valve to maintain flow control to the respective briquetting machines 817. The fines enter a small feed drum on top of the briquetting machine, and are forced between two counter-rotating rolls by a helical feed screw. The rolls are equipped with briquette shaped molds which compress the fines into briquettes. The compaction is achieved by a combination of the high pressure between the rolls and the high temperature of the fines, which makes them more compressible. The pressure is maintained by means of hydraulic cylinders that exert force against one of the two rolls. One roll is fixed and the other is allowed to move, which prevents roll breakage should a piece of metal pass through the machine.

The briquettes exit the machine 817 in a single string and are separated into individual briquettes in a rotating trommel 819. The individual briquettes, and fines and chips resulting from the trommel operation, leave the trommel in a combined stream and are separated in a hot screener 823 located below the trommels 819.

The briquetting machines 817 and trommels 819 are oriented so that the trommel discharges are in close proximity. The allows the briquettes (37) and fines/chips (38) to be transported to the screener 823 via metallic pipes which avoids the use of vibrating conveyors.

The hot screener 823 separates the briquettes from the fines and chips on two screens 825, 827. First, the product briquettes (37) are separated off on a ½" screen 825 and are quenched in a water filled tank 829 to 100 degrees C. The briquettes are discharged into a product conveyor 833 where they are dried by the heat remaining in the briquette.

The fines and chips passing through the ½" screen 825 are further separated on a ¼" screen 827. The chips between ½" and ¼" removed on the screen are quenched in a water quench tank 837 and are discharged in a pile 843 by conveyor 841. This material is suitable for sale as a byproduct. The fine fraction under ¼" passing through the screen 827 is recycled to the briquetters 817 via a bucket conveyor 847. The chips quench tank 837 is used to quench fines when they are not being recycled.

The entire briquetter system from the briquetter enclosure to the quench tanks 829, 837 is blanketed with inert gas under a slightly positive pressure. The inert gas has been treated to remove most of the $CO_2$ in order to reduce the oxidation potential of the gas.

Line 443 equipped with a cycling slide valve is provided between the briquetter feed drum 805 and the reactor quench drum 807 in order to allow fines to be dumped when the briquetters are starting up or shutting down.

The Utilities Assembly (System) and Process

The utilities assembly is comprised of a boiler feed water treating assembly; a machinery cooling water assembly; a process cooling water assembly; a package water assembly; a chilled water assembly; an inert gas cleanup and compression assembly; a forced air assembly; and, a backup electricity assembly.

In the boiler feed water treating assembly, boiler feed water is received from the industrial water main and is treated in sand and carbon filters prior to passing through deionizers. After the deionizers, the water is combined with the returning condensate from the generator steam turbine condenser and pumped to a deaerator where it is heated to 110° C. with low pressure steam to drive off $O_2$. The water can be further treated with hydrazine if required. The deaerator has a ½ hour inventory to allow operation during short term power failures.

In the machinery cooling water assembly, machinery cooling water is used to cool machinery in the process and to provide coolant in heat exchangers. The water is pumped to the users from the CCW sump and returns at a temperature of about 70° C. The water is cooled in a close heat exchange system to avoid contamination of the water by dust.

In the process cooling water assembly, process cooling water is required for cooling process gas streams and for scrubbing dust from process gas streams and from gases pulled through the dust collectors. The water returning from the various users goes to two primary and one secondary settling ponds where fine particles settle out, aided by a flocculant. The water is also cooled to about 60° C. in the ponds. Two ponds are provided so that they can be cleaned on the run. Cooled water from the ponds is pumped to an evaporative type cooling tower where the water is cooled to about 30° C. Water is pumped from the sump to the users.

In the package water assembly, a package boiler is provided for driving the steam turbine generator, for plant steam, and for fluidization steam for the preheat reactor during a power outage. The boiler can also provide inert gas from the flue instead of using flue gas from the reformer if required.

In the chilled water assembly, a refrigerant type water chiller is provided to chill a small amount of cooling water to about 10° C. This chilled water is required for drying purge gas and instrument air.

In the inert gas cleanup and compression assembly, combustion gas from the reformer is cooled and dried using cooling water. The gas is compressed in one of two compressor lines to about 20 kg/cm² and is passed through a small column where it is contacted with lean potassium carbonate solution. The $CO_2$ content is reduced from about 13% to under 1%. The gas is then dried using chilled cooling water and sent on to the briquetting and reactor area for use in purges and to blanket the briquetting machines. A small amount of inert gas is compressed to 100 kg/cm² and stored in tanks to be used for blasting plugged purges.

In the forced air assembly, instrument and utility air is provided by one of two electric motor driven compressors. The instrument air is dried using chilled water and dessicant. The instrument air is backed up by the 100 kg/cm² inert gas storage tanks via a pressure letdown valve.

In the backup electricity assembly, a condensing steam turbine driven electric generator provides sufficient power during power failures for the services listed below. Each of the pumps and compressors in the list has two 100% capacity units: one with electric motor drive hooked to the main supply and the other electric motor hooked to the generator. The fans are single units with two electric motor drives. The generator is in continuous service and provides power or backup power to the following: 1. Emergency plant lighting; 2. UPS backup; 3. Fire water pump; 4. One inert gas compressor; 5. One air compressor; 6. One BFW treating pump; 7. One BFW feed pump; 8. One machinery cooling water pump; 9. One process cooling water pump; 10. All four fans on the furnaces; and, 11. One BFW circulation pump (reformer).

The condensate from the condensing turbine is returned to the boiler feed water treating area for reuse.

Optionally, a gas turbine generator with steam generation by the exhaust gas can be used in place of the boiler with steam turbine driven electric generator.

STATE TABLES

The following represents a compilation of the states of the various flow groups throughout the plant system. Numerals in parentheses ( ) are used to identify flow group, state, and makeup at each location throughout the plant.

| CONDITION | (1) COLD NATURAL GAS FEED | (2) PREHEATED NATURAL GAS | (3) SATURATED STEAM | (4) SUPERHTD STEAM | (5) COLD STM/GAS MIXTURE | (6) HOT STM/GAS MIXTURE | (7) REFORMED GAS |
|---|---|---|---|---|---|---|---|
| TEMP, DEG C. | 35 | 370 | 235 | 500 | 460 | 600 | 825 |
| PRES, KG/CM2 | 23.5 | 22 | 22.5 | 22 | 22 | 21.8 | 19.8 |
| COMPONENT | | | | | | | |
| H2 | 0 | 2 | 0 | 0 | .46 | .46 | 44.28 |
| CO | 0 | .12 | 0 | 0 | .03 | .03 | 8.19 |
| H2O(V) | 0 | 0 | 0 | 0 | 77.17 | 77.17 | 37.68 |
| CO2 | 8.06 | 7.88 | 0 | 0 | 1.8 | 1.8 | 6.6 |
| CH4 | 83.2 | 81.41 | 0 | 0 | 18.58 | 18.58 | 3.24 |
| C2H6 | 7.52 | 7.34 | 0 | 0 | 1.68 | 1.68 | 0 |
| C3H8 | .83 | .81 | 0 | 0 | .18 | .18 | 0 |
| C4H10+ | .35 | .34 | 0 | 0 | .08 | .08 | 0 |
| N2 | .04 | .09 | 0 | 0 | .01 | .01 | .02 |
| O2 | 0 | 0 | 0 | 0 | 0 | 0 | 0 |
| H2O(L) | 0 | 0 | 100 | 100 | 0 | 0 | 0 |
| KGMOL/HR | 495.87 | 507.27 | 1715.02 | 1715.02 | 2222.28 | 2222.28 | 3040.16 |
| SM3/HR | 11107.38 | 11362.85 | 38416.42 | 38416.42 | 49779.15 | 49779.15 | 68099.62 |

| CONDITION | (8) REFORMED GAS TO SHIFT | (9) REFORMED GAS FROM SHIFT | (10) REFORMED GAS FROM NG HCHNGR | (11) REFORMED GAS FROM BFW HCHNGR | (12) AIR FROM MAIN AIR COMPRSSR | (13) HOT AIR FOR PREHT REACTOR | (14) GAS OUT RADIANT SECTION |
|---|---|---|---|---|---|---|---|
| TEMP, DEG C. | 370 | 430 | 360 | 182 | 150 | 760 | 970 |
| PRES, KG/CM2 | 19.5 | 19.1 | 18.6 | 18.3 | 12.5 | 12 | 0 |
| COMPONENT | | | | | | | |
| H2 | 44.28 | 49.96 | 49.96 | 49.96 | 0 | 0 | 0 |
| CO | 8.19 | 2.5 | 2.5 | 2.5 | 0 | 0 | 0 |
| H2O(V) | 37.68 | 31.99 | 31.99 | 31.99 | .5 | .5 | 17.29 |
| CO2 | 6.6 | 12.28 | 12.28 | 12.28 | 0 | 0 | 9.56 |
| CH4 | 3.24 | 3.24 | 3.24 | 3.24 | 0 | 0 | 0 |
| C2H6 | 0 | 0 | 0 | 0 | 0 | 0 | 0 |
| C3H8 | 0 | 0 | 0 | 0 | 0 | 0 | 0 |
| C4H10+ | 0 | 0 | 0 | 0 | 0 | 0 | 0 |
| N2 | .02 | .02 | .02 | .02 | 78.5 | 78.5 | 71.44 |
| O2 | 0 | 0 | 0 | 0 | 21 | 21 | 1.71 |
| H2O(L) | 0 | 0 | 0 | 0 | 0 | 0 | 0 |
| KGMOL/HR | 3040.16 | 3040.16 | 3040.16 | 3040.16 | 948.69 | 948.69 | 2473.4 |
| SM3/HR | 68099.62 | 68099.62 | 68099.62 | 68099.62 | 21250.66 | 21250.66 | 55404.15 |

| CONDITION | (15) REFORMER FLUE GAS | (16) PRODUCT HYDROGEN | (17) GAS TO VENT FROM CO2 REMVL | (18) BURNER NATURAL GAS | (19) BURNER AIR | (20) TREATED BFW TO PROCESS |
|---|---|---|---|---|---|---|
| TEMP, DEG C. | 135 | 87 | 100 | 30 | 295 | 100 |
| PRES, KG/CM2 | 0 | 18 | 0 | 1.5 | 0.5 | 29 |
| COMPONENT | | | | | | |
| H2 | 0 | 86.07 | 0 | 0 | 0 | 0 |
| CO | 0 | 4.31 | 0 | 0 | 0 | 0 |
| H2O(V) | 17.29 | 3.5 | 71.42 | 0 | .5 | 0 |
| CO2 | 9.56 | .5 | 28.58 | 8.06 | 0 | 0 |
| CH4 | 0 | 5.59 | 0 | 83.2 | 0 | 0 |
| C2H6 | 0 | 0 | 0 | 7.52 | 0 | 0 |
| C3H8 | 0 | 0 | 0 | .83 | 0 | 0 |
| C4H10+ | 0 | 0 | 0 | .35 | 0 | 0 |
| N2 | 71.44 | .03 | 0 | .04 | 78.5 | 0 |
| O2 | 1.71 | 0 | 0 | 0 | 21 | 0 |
| H2O(L) | 0 | 0 | 0 | 0 | 0 | 100 |
| KGMOL/HR | 2473.4 | 1725 | 1275.47 | 214.5 | 2247.75 | 1800.77 |
| SM3/HR | 55404.15 | 38640 | 28570.53 | 4804.8 | 50349.5 | 40337.27 |

| CONDITION | (21) HEATED BFW | (22) BLOWDWN | (23) H2 RECYCLE | (24) NAT GAS FOR PREHEAT REACTOR | (25) MAKEUP GAS |
|---|---|---|---|---|---|
| TEMP, DEG C. | 235 | 235 | 87 | 30 | 89 |
| PRES, KG/CM2 | 28.5 | 28 | 18 | 25 | 17.1 |
| COMPONENT | | | | | |

-continued

| | | | | | |
|---|---|---|---|---|---|
| H2 | 0 | 0 | 86.07 | 0 | 86.07 |
| CO | 0 | 0 | 4.31 | 0 | 4.31 |
| H2O(V) | 0 | 0 | 3.5 | 0 | 3.5 |
| CO2 | 0 | 0 | 0.5 | 8.06 | .5 |
| CH4 | 0 | 0 | 5.59 | 83.2 | 5.59 |
| C2H6 | 0 | 0 | 0 | 7.52 | 0 |
| C3H8 | 0 | 0 | 0 | .83 | 0 |
| C4H10+ | 0 | 0 | 0 | .35 | 0 |
| N2 | 0 | 0 | .03 | .04 | .03 |
| O2 | 0 | 0 | 0 | 0 | 0 |
| H2O(L) | 100 | 100 | 0 | 0 | 0 |
| KGMOL/HR | 1800.77 | 85.75 | 39.68 | 90.85 | 1725 |
| SM3/HR | 40337.27 | 1920.82 | 888.83 | 2035.04 | 38640 |

| CONDITION | (26) RECYCLE GAS | (27) TOTAL REDUCING GAS | (28) GAS EXITING BOTTOM REDUCING REACTOR | (29) MIDDLE REDUCING REACTOR | (30) TOP REDUCING REACTOR | (31) PREHEAT REACTOR |
|---|---|---|---|---|---|---|
| TEMP, DEG C. | 95 | 834 | 765 | 720 | 690 | 750 |
| PRES, KG/CM2 | 16.0 | 15.6 | 11.9 | 11.4 | 10.9 | 10.5 |
| COMPONENT | | | | | | |
| H2 | 49.81 | 57.72 | 52.49 | 43.2 | 39.21 | 0 |
| CO | 8 | 7.14 | 8.54 | 7.85 | 6.3 | 0 |
| H2O(V) | .5 | 1.5 | 8.47 | 16.99 | 21.7 | 30.75 |
| CO2 | 4.27 | 3.42 | 1.49 | 1.3 | 3.36 | 8 |
| CH4 | 32.89 | 26.72 | 25.49 | 27.05 | 25.88 | 0 |
| C2H6 | 0 | 0 | 0 | 0 | 0 | 0 |
| C3H8 | 0 | 0 | 0 | 0 | 0 | 0 |
| C4H10+ | 0 | 0 | 0 | 0 | 0 | 0 |
| N2 | 4.53 | 3.51 | 3.52 | 3.61 | 3.56 | 59.75 |
| O2 | 0 | 0 | 0 | 0 | 0 | 1.5 |
| H2O(L) | 0 | 0 | 0 | 0 | 0 | 0 |
| KGMOL/HR | 6000 | 7750 | 7758 | 7630 | 7774 | 1254 |
| SM3/HR | 134400 | 173608 | 173779 | 170912 | 174138 | 28090 |
| ENTRAINMENT, T/H | | | 1.233 | 1.233 | 1.233 | .482 |

| COMPONENT | (32) ORE FEED | (33) FROM PREHEAT REACTOR | (34) FROM TOP REDUCING REACTOR | (35) FROM MIDDLE REDUCING REACTOR | (36) FROM BOTTOM REDUCING REACTOR |
|---|---|---|---|---|---|
| Fet | 65.89 | 68.58 | 77.49 | 87.53 | 94.05 |
| Fe2O3 | 93.94 | 98.05 | 0 | 0 | 0 |
| Fe3O4 | 0 | 0 | 0 | 0 | 0 |
| FeO | 0 | 0 | 91.6 | 45.04 | 9.67 |
| Fe | 0 | 0 | 6.29 | 52.52 | 86.53 |
| Gangue | 1.84 | 1.91 | 1.94 | 2.16 | 2.16 |
| Carbon | 0 | 0 | .08 | .07 | 1.38 |
| MgO | .02 | .04 | .09 | .21 | .25 |
| Free H2O | .1 | 0 | 0 | 0 | 0 |
| Bound H2O | 4 | 0 | 0 | 0 | 0 |
| Metallization | 0 | 0 | 8.11 | 60 | 92 |
| Flow Rate, T/H | 90 | 85.75 | 76.05 | 67.41 | 61.5 |

| COMPONENT | (37) PRODUCT | (38) CHIPS AND OTHER LOSSES | (39) RAW IRON ORE | (40) FROM ORE DRIER |
|---|---|---|---|---|
| TEMP, DEG C. | | | 30 | 105 |
| PRES, KG/CM2 | | | 0 | 0 |
| Fet | 94.05 | 94.05 | 62.06 | 65.89 |
| Fe2O3 | 0 | 0 | 88.48 | 93.94 |
| Fe3O4 | 0 | 0 | 0 | 0 |
| FeO | 9.67 | 9.67 | 0 | 0 |
| Fe | 86.53 | 86.53 | 0 | 0 |
| Gangue | 2.16 | 2.16 | 1.73 | 1.74 |
| Carbon | 1.38 | 1.38 | 0 | 0 |
| MgO | .25 | .25 | .02 | .02 |
| Free H2O | 0 | 0 | 6 | .12.. |
| Bound H2O | 0 | 0 | 3.77 | 4 |
| Metallization | 92 | 92 | | |
| Flow Rate, T/H | 60 | 1.5 | 96.1 | 90 |

| CONDITION | (41) NATURAL GAS | (42) GAS | (43) AIR GAS | FLUE GAS |
|---|---|---|---|---|
| TEMP, DEG C. | 30 | 30 | 105 | |
| PRES, KG/CM2 | 1.5 | .5 | −.0005 | |
| COMPONENT | | | | |
| CH4 | 83.07 | 0 | 0 | |
| C2H6 | 7.76 | 0 | 0 | |
| C3H8 | .53 | 0 | 0 | |
| C4H10+ | .29 | 0 | 0 | |
| N2 | 0 | 78.5 | 33.9 | |

| | | | |
|---|---|---|---|
| O2 | 0 | 21 | .83 |
| CO2 | 8.35 | 0 | 4.58 |
| H2O(V) | 0 | .5 | 60.69 |
| KGMOL/HR | 25.05 | 259.6 | 600.8 |
| ENTRAINED SOLIDS KG/HR | | | 420 |

What is claimed is:

1. In a processing plant for reducing wet iron ore fines under ⅛" including a reactor assembly, a preheat reactor assembly, and, an ore feed assembly with an ore feed conduit means for transferring iron ore to said reactor assembly, said preheat reactor assembly comprising:
    a preheat reactor;
    a quench and gas cleanup system;
    an airstream source means for providing an airstream;
    a natural gas source means for providing natural gas;
    said preheat reactor including:
        a reactor vessel including an upper cavity portion and a lower cavity portion;
        ore inlet port means for connecting said upper cavity portion to the ore feed conduit means;
        gaseous exhaust port means for connecting said upper cavity portion to said quench and gas cleanup system;
        ore outlet port means for providing an exit for ore fines from said lower cavity portion and out of said preheat reactor;
        air intake port means connecting said lower cavity portion to said airstream source means and facilitating the development of an airstream upward from the lower cavity portion to the upper cavity portion and out of the gaseous exhaust port means;
            said airstream passing through falling iron ore fines and developing a fluidized bed of iron ore fines within said reactor vessel;
            said air intake port means being located below said ore outlet port means;
        natural gas injection means for injecting natural gas into said airstream and for igniting said natural gas in said airstream;
            said natural gas injection means including natural gas intake port means connecting said lower cavity portion to said natural gas source means; and,
        combustion air means for providing combustion air and mixing combustion air with said natural gas to facilitate combustion, said mixture being referred to as flue gas.

2. The preheat reactor assembly as recited in claim 1, said preheat reactor assembly including
    airstream distribution means for developing an evenly distributed, upflowing airstream across the cross-section of said reactor vessel;
    said airstream distribution means being located between the air intake port means and the ore outlet port means in the lower cavity portion.

3. The preheat reactor assembly as recited in claim 1, said airstream distribution means including
    a gas distribution grid.

4. The preheat reactor assembly as recited in claim 1, said airstream distribution means comprising
    a flat perforated circular plate;
    a vertical cylinder comprising thin plate steel; and,
    multiple vertical, small diameter tubes;
        the outside diameter of said vertical cylinder in abutting relation with the inside diameter of said reactor vessel;
        said vertical cylinder being seated in the bottom of said lower cavity portion and having an upward facing portion;
        said flat perforated circular plate being slightly smaller in diameter than the inside diameter of said reactor vessel;
        said flat perforated circular plate being fixed to said upward facing portion of the vertical cylinder;
        said vertical, small diameter tubes jutting through perforations in said flat perforated circular plate and being fixed to said flat perforated circular plate;
        said flat perforated circular plate being supported centrally by said vertical, small diameter tubes;
        said airstream being forced into and directed upward through said vertical, small diameter tubes.

5. The preheat reactor assembly as recited in claim 4, said flat perforated circular plate having
    an evenly distributed series of perforations across its cross sectional area producing an evenly distributed upward air flow across the cross sectional area of said preheat reactor as flue gas is delivered into said lower cavity portion and forced through said vertical, small diameter tubes.

6. The preheat reactor assembly as recited in claim 1, said preheat reactor assembly including
    ore and gas separating means for separating entrained ore fines from gases exiting said gaseous exhaust port means and returning de-entrained ore fines to the mainstream flow of iron ore fines prior to said ore outlet port means;
    said ore and gas separating means being located within said upper cavity portion and in front of said gaseous exhaust port means.

7. The preheat reactor assembly as recited in claim 6, said ore and gas separating means including
    pairs of primary and secondary cyclones.

8. The preheat reactor assembly as recited in claim 7, said cyclones including
    externally actuated valve means for sealing off the cyclones in the event said cyclones become plugged with iron ore fines.

9. The preheat reactor assembly as recited in claim 1, said ore outlet port means including
    a refractory lined ore pipe;
        said refractory lined pipe including cycling slide valve means for maintaining constant solids flow from said preheat reactor;
        said refractory lined ore pipe connecting to a subsequent stage of the reactor assembly.

10. The preheat reactor assembly as recited in claim 9, said preheat reactor assembly including
    inert gas source means for supplying a flow of inert gas into said refractory lined ore pipe and into the preheat reactor preventing air from being carried to a subsequent stage of the reactor assembly.

11. The preheat reactor assembly as recited in claim 1, said gaseous exhaust port means including multiple gas outlet pipes and a refractory lined gas outlet pipe;
said multiple gas outlet pipes connecting to said refractory lined gas outlet pipe;
said refractory lined gas outlet pipe connecting to said quench and gas cleanup system.

12. The preheat reactor assembly as recited in claim 11, said ore and gas separating means including cyclones;
said cyclones being positioned in front of said multiple gas outlet pipes.

13. The preheat reactor assembly as recited in claim 1, said quench and gas cleanup system including
gas cooling means for cooling exiting gases;
scrubber means for scrubbing exiting gases;
venting means for venting exiting gases;
said venting means including pressure letdown valve means for depressurizing exiting gases and at least one stack for releasing exiting gases; and,
conduit means connecting said gas cooling means, said scrubber means, and said venting means.

14. The preheat reactor assembly as recited in claim 1, said combustion air means including
a centrifugal air compressor;
said centrifugal air compressor including
suction filters to eliminate dust; and
water cooled intercoolers to remove the heat of compression.

15. The preheat reactor assembly as recited in claim 1, said combustion air means including
means for preheating combustion air to approximately 700–750 degrees C.

16. The preheat reactor assembly as recited in claim 15, said means for preheating combustion air including a reformer heat recuperator system.

17. The preheat reactor assembly as recited in claim 1, said natural gas injection means comprising a series of burners located within said lower cavity portion and about the circumference of said reactor vessel.

18. The preheat reactor assembly as recited in claim 17, said preheat reactor including a gas distribution means located within said lower cavity portion;
said natural gas injection means located above said gas distribution means.

19. The preheat reactor assembly as recited in claim 18, said natural gas injection means being located about 1 meter above the gas distribution means.

20. The preheat reactor assembly as recited in claim 1, said natural gas injection means in combination with said combustion air means maintaining an air to gas ratio of about 2% $O_2$ mixing with the natural gas, the combination thereof being referred to as flue gas.

21. The preheat reactor assembly as recited in claim 17, said preheat reactor including
burner de-plugging means for preventing plugging of said burners.

22. The preheat reactor assembly as recited in claim 21,
said preheat reactor including purge gas supply means for supplying purge gas;
said burner de-plugging means including means for injecting said purge gas through said burners.

23. The preheat reactor assembly as recited in claim 22, said purge gas comprising
steam.

24. The preheat reactor assembly as recited in claim 22, said burner de-plugging means including means for controlling the injection of said purge gas.

25. The assembly as recited in claim 1, said preheat reactor comprising
a carbon steel shell and a dual insulation and refractory layer;
said dual insulation and refractory layer internally lining said carbon steel shell.

* * * * *